July 15, 1947. C. HAROLD Re. 22,900

POWER UNIT FOR AMUSEMENT DEVICES AND THE LIKE

Original Filed July 29, 1939 3 Sheets-Sheet 1

WITNESS
G. V. Rasmussen

INVENTOR
CHARLES HAROLD
BY
Brisco & Schwenk
ATTORNEYS

POWER UNIT FOR AMUSEMENT DEVICES AND THE LIKE

Original Filed July 29, 1939 3 Sheets-Sheet 2

WITNESS
G. V. Rasmussen

INVENTOR
CHARLES HAROLD
BY
Brisco & Hibbert
ATTORNEYS

July 15, 1947. C. HAROLD Re. 22,900

POWER UNIT FOR AMUSEMENT DEVICES AND THE LIKE

Original Filed July 29, 1939 3 Sheets-Sheet 3

WITNESS

G. V. Rasmussen

INVENTOR

CHARLES HAROLD

BY

Brisen & Schurck

ATTORNEYS

Reissued July 15, 1947

Re. 22,900

UNITED STATES PATENT OFFICE 22,900

POWER UNIT FOR AMUSEMENT DEVICES AND THE LIKE

Charles Harold, Butler, N. J., assignor, by mesne assignments, of eighty-five per cent to John Burton Tigrett and Francis Tomlin Tigrett, a copartnership, doing business as Future Unlimited, Jackson, Tenn., and fifteen per cent to Dos T. Hatfield, Arlington, Va.

Original No. 2,240,906, dated May 6, 1941, Serial No. 287,213, July 29, 1939. Application for reissue April 22, 1947, Serial No. 743,032

8 Claims. (Cl. 46—119)

This invention relates to a power plant or unit useful in actuating toys, amusement and advertising devices and the like, and in its broader scope providing a power or force-creating means for operating various devices within the limits of the power created by the construction of this invention.

Toys, amusement and advertising devices, which require motive power for operating the same, have usually been equipped with motors of various types, particularly electrical, vibratory or spring-operated, all requiring a source of power, such as a spring, a battery, or other power source. Such devices require considerable attention, in order that the devices operated thereby, will function constantly and, in addition, over periods of time, have proven to be expensive.

The device of this invention is self-contained and self-sufficient for power purposes and will operate indefinitely, by the power or force created by the inherent characteristics of the invention, with practically no attention or supervision on the part of the operator and further, is comparatively inexpensive to manufacture.

The invention, for the purposes of illustration, is shown embodied in a grotesque duck-like figure shown in Figs. 1 to 6 and in an advertising sign for window display shown in Figs. 8 to 13. The underlying principle of the invention may be utilized for supplying power or force to innumerable objects, articles or devices where movement of substantially the whole of the article or parts thereof is desired for the purpose of amusing, playing games, or in its broader aspect, the creation of power for utilitarian purposes.

Figure 1:
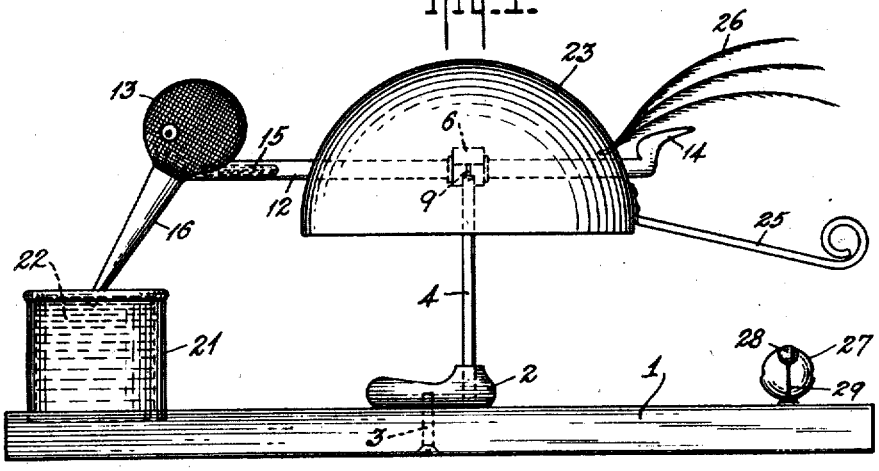
Figure 2:
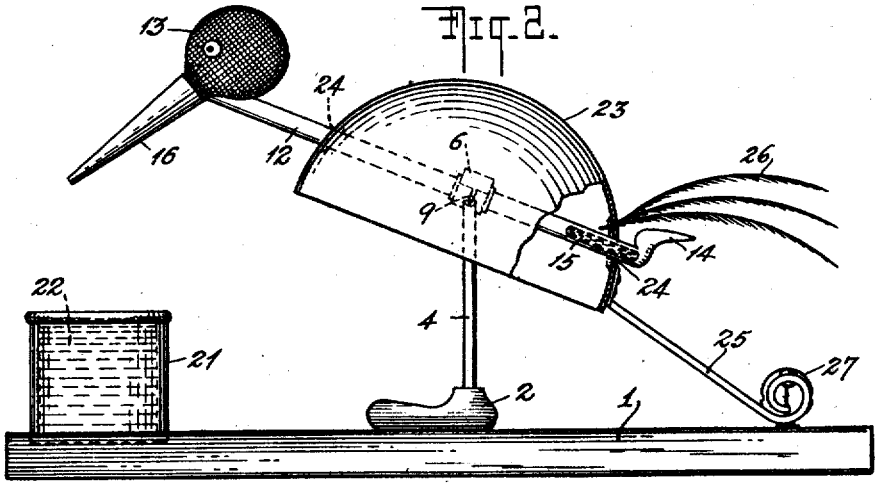
Figure 3:
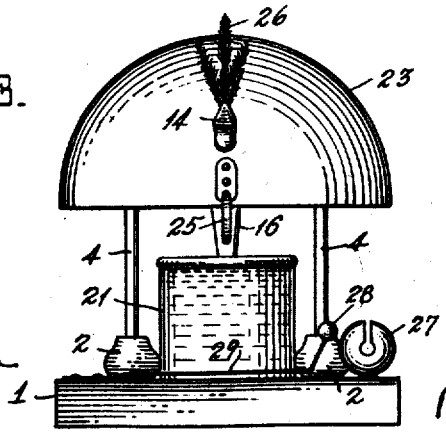
Figure 4:
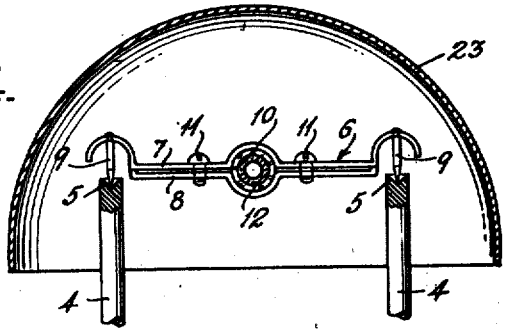
Figure 5:
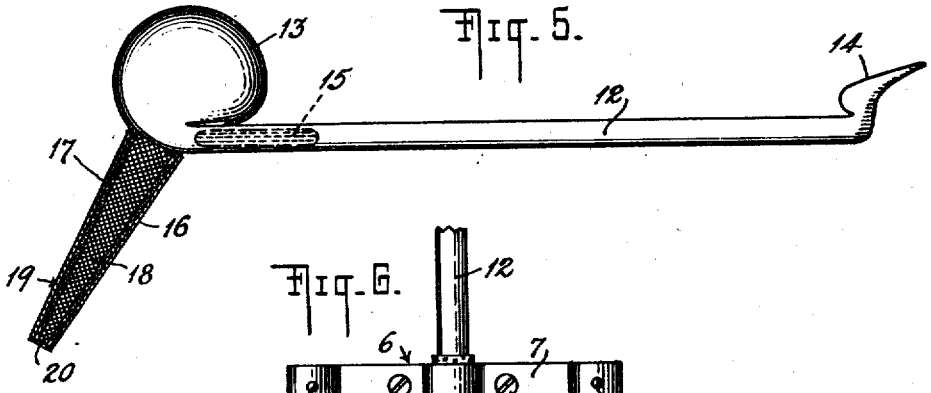
Figure 6:
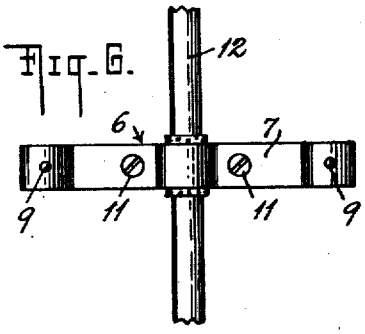
Figure 7:
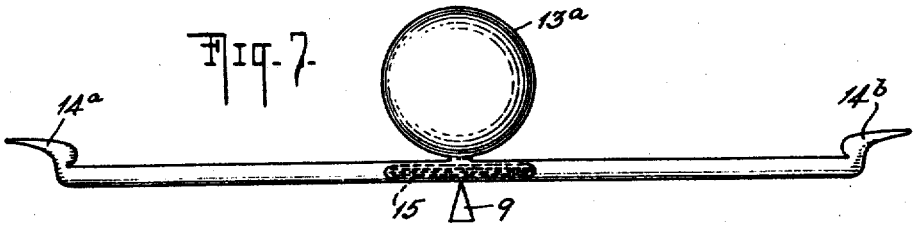
Figure 8:
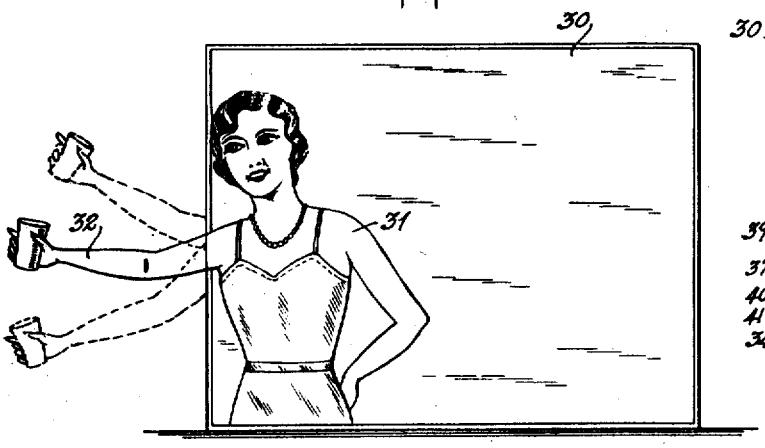
Figure 9:
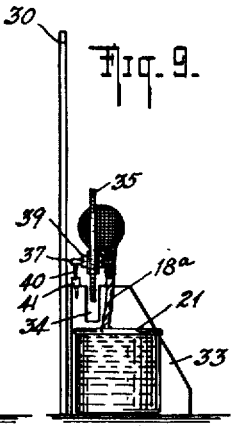
Figure 10:
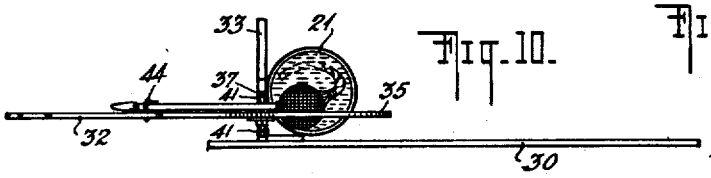
Figure 13:
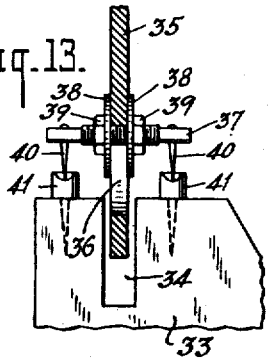
Figure 11:
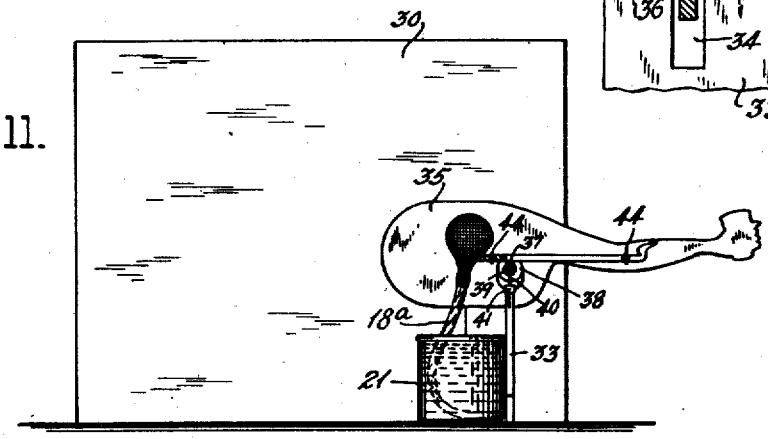
Figure 12:
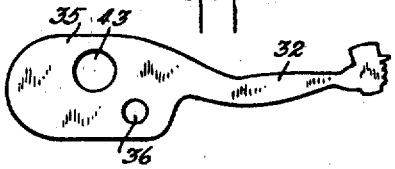

In the drawings, Fig. 1 represents a side elevation of the invention embodied in a duck-like figure; Fig. 2 is the same view as Fig. 1 showing change of position of the duck; Fig. 3, is a rear end view of Fig. 1; Fig. 4 is a section showing the major portion of the mounting of the body of the duck; Fig. 5 is a side view, partly in section, of the power unit; Fig. 6 is a detail plan of the mounting shown in Fig. 4; Fig. 7 is a modification of Fig. 5; Fig. 8 is a front elevation of an advertising device embodying the power unit; Fig. 9 is an end elevation of Fig. 8; Fig. 10 is a top plan view of Fig. 8; Fig. 11 is a rear elevation of the device of Fig. 8; Fig. 12 is a detail of the moving arm; and Fig. 13 is an enlarged detail section of the mounting of the moving arm in the advertising device.

The duck shown in Figs. 1 to 6 is mounted upon a plate 1 made of glass or other material to which the feet 2 are secured by screws 3. The legs 4 are set into the feet 2 and constitute stationary supports for the device. The legs 4 are provided with recesses 5 carrying the supporting unit 6. The supporting unit 6 is made up of two plates 7 and 8, curved at their outer ends, and provided with knife edges or pointed pins 9 which rest upon the low point or base of the recesses 5 providing delicate pivoting points for the support 6. The plates 7 and 8 are each bent or bowed in the form of a substantial half-circle to form, when the plates are together, an opening 10, the plates being secured together by the screws 11. A section of tubing 12, preferably of glass or plastic, is mounted through the opening 10 and between the plates 7 and 8 and adjustable in the plates when the screws 11 are released. The tubing 12 has formed, or carries, at one end thereof, an enlargement or head, hereinafter called the cold end 13, and preferably a small, sealed bulb at the opposite end, hereinafter called the warm end 14. The tube 12 and the cold and warm ends 13 and 14 are exhausted or substantially exhausted of air to create a vacuum therein and a small quantity of a heat-sensitive medium 15, such as a readily boiling liquid, preferably a low boiling point liquid, for instance, ethyl alcohol, methyl alcohol, acetone, ethyl chloride or other low boiling point liquids or mixtures thereof, is placed in the tube. The heat-sensitive medium 15 is therefore confined within the vacuum tube 12 and may readily move within the tube to and from the warm and the cold ends thereof. The head or cold end 13 is provided with a depending member 16 comprising any suitable core 17, an intermediate enveloping sheet of fabric, called the wick 18 hereinafter, and an outer shell 19 which is slipped over the wick 18 to lightly contact and hold it in place. The fabric of the wick 18 is continued over the head or cold end 13 so as to envelop it, being laid thereon preferably in smooth condition. The extreme end 20 of the wick is exposed at the bill of the duck. The tube 12 is mounted in the support 6 and so adjusted in order that when the pool of the heat-sensitive medium is at the cold end there is a slight inclination of the tube from the true horizontal, from the cold end, toward the warm end. It might be found somewhat awkward to adjust the tube, by sliding it in the support 6, and if desired a small shiftable lead collar or weight may be placed around the tube 12, in the region of the cold end, in order that it may be shifted to bring about the desired balance and inclination of the tube in the support 6. A reservoir 21 which contains preferably water, constitutes the source of a cooling medium 22. The position of the reservoir 21 should be such that the extreme end 20 of the wick will readily submerge when the head or cool end is in a depressed condition. A body 23 is preferably provided over the support 6, the tube 12 passing through suitable holes 24 in the body 23. In the specific example shown in Figs. 1 to 3, a counter-balance 25 is used to offset the weight of the head or cold end 13 and the weight of the counter-balance must be taken into consideration when adjusting the tube in the support 6.

In order to make the device attractive to the eye, the feet 2, legs 4, bill 16, head or cold end 13 and body 23 are suitably decorated and colored and the body may be provided with tail feathers 26. A bell 27 is mounted upon the base 1 and a striker 28 on the supporting wire 29 is mounted on the plate 1 in the path of the descending counter-weight 25 in order that the counter-weight will actuate the bell each time it strikes the wire 29. The operation of the device shown in Figs. 1 to 3 is as follows: After the device is assembled and adjusted, for the purpose of obtaining a slight inclination toward the warm end as above explained, the bill is depressed in order that the extreme end of the wick enters below the surface of the water 22 and in order to expedite the quick initial operation of the device, that portion of the wick over the cold end may also be initially wetted. The tube is then preferably given an initial rocking motion which, when the warm end is depressed, will cause the heat-sensitive medium 15 to flow downwardly inside of the tube toward the warm end. In practical use of the embodiment of this invention as shown in the accompanying drawings, there is usually present a constant body or pool of the heat-sensitive medium, which tends at all times to flow toward the warm end by reason of the slight inclination of the device when balanced from the cold end toward the warm end. That portion of the pool of heat-sensitive medium which is nearest the warm end, volatilizes or vaporizes readily and develops between the warm end of the tube and the constant pool of heat-sensitive medium a considerable vapor pressure and as such vapor pressure continues to be developed, a sufficient pressure or force is generated which pushes or drives the pool of condensed liquid toward the cold end. This action may be noted by the continuous formation of bubbles in the warm end, indicating vaporization of a portion of the heat-sensitive medium, which vaporization ultimately develops pressure of such a character sufficient to move the pool of condensed heat-sensitive medium toward the cold end (past the pivotal point), which thereupon over-weights the cold end and causes depression or downward movement thereof. The generated vapor naturally follows the flow of the constant pool of condensed heat-sensitive medium and as the pressure is reduced such vaporized portion of the heat-sensitive medium is in whole or in part condensed at the cold end when reaching the cold end. The entire pool thereafter is free to flow toward the warm end and depress the warm end, reversing the direction of movement of the entire power unit. This cycle of operation continues over indefinite periods of time (for days and weeks), in fact, as long as a sufficient supply of liquid or cooling medium is contained in the reservoir to provide a level into which the bill may dip.

It has also been observed, in the practical operation of these devices, that vapor generated at the warm end moves to the cold end through or around the pool or column of the condensed portion of the heat-sensitive medium and is condensed at the cold end. In fact, it is assumed that there may be vapor pressure present at substantially all times in the enlargement at the cold end but the presence or absence of such vapor in the cold end is not material to the proper functioning of the devices.

In the particular embodiment shown in the drawings, the heat-sensitive medium is ethyl alcohol which has the characteristic of maintaining a pool or column of condensed material between it and the warm end. If ether is used in the device in place of ethyl alcohol, it being more volatile, a constant stream of bubbles, indicating vapor, moves toward the cold end, such bubbles being there condensed. It is deemed advisable, when ether is used as the heat-sensitive medium, that the tubing 12, rather than having a large bore such as 4 mm., be provided with a capillary bore, the latter tending to hold a constant column of liquid more readily than the larger bore.

The only attention which the device requires is replenishing the water in the reservoir to maintain the required level, otherwise the device is self-contained and operates constantly. In the construction shown in Figs. 1 to 3, each time the warm end descends to such extent as to bring the counter-weight 25 in contact with the striker 28, the bell will be sounded.

In the practical embodiment shown in Figs. 1 to 3 the device does not have a stroke, in each reciprocation, of the same length or magnitude, which condition is purposely created in order that there should be a variance in the dipping of the duck-bill and that the bell should only be sounded when the movement of the warm end is accomplished with its longest stroke and greatest force. Nevertheless, the stroke is always sufficient to usually dip the bill-end into the water of the reservoir, although it has been observed that at times the bill does not always enter below the water level, but even under the latter conditions the device functions properly. It has been found that the type and amount of the heat-sensitive medium utilized in the tube contributes towards the irregularity of the length of the stroke. Thus, for instance, in the device shown in Figs. 1 to 3, ethyl alcohol is used, as the heat-sensitive medium, in an amount substantially 1.2 cc. providing a pool of about 3 to 3½ inches in the tube, which is about 6 inches long and has a 6 millimeter outside diameter and about a 4 millimeter inside diameter. In the device shown in Figs. 8 to 13, the heat-sensitive medium, suggested for use, is methyl alcohol, which has a lower boiling point than ethyl alcohol, and under the conditions explained in that connection the movement of the device has been found to be of more uniform stroke and somewhat faster than the device of Figs. 1 to 3.

The theory upon which this device operates, as understood by me, is that the heat-sensitive medium, in a substantial vacuum, when at the warm end of the tube, boils, and condenses when it reaches the cooler areas of the tube in the neighborhood of the cold end. The difference in the temperature between the warm and the cold ends is obtained by the constant evaporation of the water from the wick, creating a sufficient temperature difference at the two ends of the tube to cause alternate vaporization or volatilization of the heat-sensitive medium and condensation thereof, the weight of the medium, when condensed, creating motion or power, and inasmuch as the device is fairly delicately mounted upon the knife-edged pins 9 the weight of the condensed pool of heat-sensitive medium is sufficient to cause continuous operation of the device as the cycle of volatilization or evaporation and condensation of the heat-sensitive medium functions.

The device will operate under normal room temperature conditions, there being sufficient difference in temperature between the warm and the cold ends to permit the completely satisfactory functioning of the device. Cold or warm drafts affect the speed of movement and the length of the stroke. It will thus be found that if smoke from a burning cigarette is permitted to contact the warm end, there is an acceleration of motion, though such practice is not at all necessary nor desired, but is merely referred to to give a more lucid explanation of the operative theory underlying this invention.

In show windows, during the summer months, the room temperature often rises to over 95°, due in part to the use of electric lights for illuminating purposes, and in order to keep the temperature reduced as much as possible, storekeepers use electric fans in such show windows. Demonstrations of the device of this invention have been made under such show window conditions and it has been found that the device functions very satisfactorily in spite of the high temperature. In fact high temperatures have been found to be a contributing factor to the operation of the device, inasmuch as volatilization at the warm end and evaporation of the cooling medium at the cool end is accelerated.

In Fig. 7, a modification of this device is shown in which the "cold end" 13*a* is situated between two warm ends 14*a* and 14*b*. In this type of operation the heat-sensitive medium 15 flows alternately from one hot end past the cold end to the other hot end. Assuming that the inclination of the device is downwardly toward the hot end 14*a*, the pool 15 will thereupon vaporize and as the vapor travels upwardly toward the cold end and toward the hot end 14*b* the vapor will commence to be condensed and when it reaches the region of the pivots 9 the hot end 14*b* will start downwardly and the hot end 14*a* will start upwardly, and the condensed pool will then flow down the inclination of the tube toward the hot end 14*b* where vaporization will take place and the vapor will flow upwardly toward the cold end 13*a* to repeat the cycle of motion. Devices of the double acting type of Fig. 7 have considerably greater velocity than devices of Figs. 1 to 3 and consequently more power. It can be readily understood that such a device is in the nature of a see-saw and can be used for many purposes, for instance as a toy upon the extreme ends of which two figures may be mounted to provide a see-saw toy.

A further illustration of this invention is shown in connection with an advertising sign (see Figs. 8–13), representing a woman going through the motions of lifting a glass of beverage. In this illustration of the invention the power unit is utilized to raise the pivoted arm of the woman from a position below the shoulder to a considerable distance above it.

The background 30 comprising a suitably decorated section of cardboard, embodies as printed matter, or, if desired, in relief, the representation of a woman 31, whose right arm 32, also made of cardboard, extends beyond the background 30 and is supported for movement with respect to the background. Such support comprises an easel 33, which is preferably hinged to the back of the background 30 by a fabric hinge so that for packing purposes it may lie flat thereagainst. The easel 33 is provided with a slot 34 into which the enlargement 35 on the end of the woman's arm fits. The enlargement 35 is provided with an aperture 36 into which a metal threaded bushing 37 fits, secured to the opposite faces of the enlargement 35 by the disc flanges 38 and nuts 39. The bushing 37 is provided with downwardly projecting pins 40 fitting into metal cups 41 which are provided with pins at their bottom forced into the body of the easel 33, one on each side of the slot 34. It will therefore be observed that the woman's arm is freely pivoted for movement. In order to actuate the arm with the power unit, the head or cold end 13 is partially inserted into an aperture 43, in order that the head will remain in said aperture and remain in engagement therewith. Actually the fabric covering or wick 18 is partly within the aperture 43 but must not be in contact with the material of the enlargement, inasmuch as the transmission of moisture to the cardboard is to be avoided. The wick 18*a* extends from one side of the head 13 a considerable distance into a reservoir 21, in order that it is well submerged in the cooling medium and to provide a slack or loop so as not to impede the free motion of the head by a drag thereon. The tube 12 is attached to the back of the arm by suitable metal staples 44. In the embodiment of this invention in said advertising sign, the mode of operation is somewhat different than in the duck shown in Figs. 1–3, but, nevertheless, embodying the subject of this invention. In this advertising sign embodiment, the tube, head, or cold end and the warm end are of the same size and dimensions, although the bill of the duck is omitted, but the heat-sensitive medium is methyl alcohol, inasmuch as its action is somewhat faster than ethyl alcohol. In this modification the head or cold end 13 is pivoted in advance of the pins 9 in a definite relation to the length of the arm and its consequent period of oscillation. When the arm 32 is in its most upward position, the tube mounting must be adjusted in relation to its staple mounting 44 so that the heat-sensitive medium will be trapped in the head 13 and necessarily in advance of the pivot point or pins 9. The position of the cold end in advance of the pivot 37 must be sufficient so that when the arm starts its downward swing, a perceptible time interval will elapse, allowing the liquid, heat-sensitive medium to flow down by gravity at the precise instant desired. In consequence, any length of arm or actuated part may be used within reasonable limits. In operation with the device adjusted as herein described, the lifted arm by reason of its weight will start movement downwardly, which will be transmitted to the attached power unit and as the power unit assumes an inclined position of less than 180°, the heat-sensitive medium will flow out of the head or cold end by gravity toward the warm end, where the volatilization action heretofore described takes place, resulting in the movement of the heat-sensitive medium back toward the cold end, resulting in rotation or movement of the cold end, which movement is transmitted to the arm, causing it to be elevated. The warm end of the device moves an appreciable extent, in fact sufficient to provide an inclination from the warm end to the cold end to spill all of the heat-sensitive medium into the head, where it remains trapped for a short period of time until the uplifted arm again causes a reverse inclination of the tube. This peculiar action is of considerable importance in actuating certain types of devices, particularly in instances where a number of power units are utilized to operate a single actuated device. In adjusting such a series of power units, they may be initially adjusted so that the heat-sensitive medium of each device is in its appropriate head or cold end and consequently the heat-sensitive medium of each device is released at the same time, resulting in synchronized motion of all of the power units, mounted on a single shaft. Were the power units so arranged in a series, not adjusted to initially carry substantially all of the heat-sensitive medium in the head or cold end, but rather carry the heat-sensitive medium in the hollow portion of the tube, there would be a tendency of the devices to be out of step and consequently to counteract or fight each other.

It is essential in the operation of this invention that there be a temperature difference between the cold and warm ends.

It has been found that the wick may be omitted and in place thereof the heat at the cold end of the device may be carried off by merely dipping the metal bill-like appendage into a cooling medium such as water. A temperature difference between the hot and cold end must exist but such temperature difference need be but slight—of the order of 2°, although acceleration of movement is more marked if there is a larger differential.

What is claimed is:

1. A toy, amusement device or the like, comprising an operated member, said member representing an object adapted to convey intelligence to the observer, an operating member adapted to create power and cooperatively associated with said operated member, said operating member comprising an air-exhausted hollow member, a support associated with said hollow member with respect to which said hollow member has cyclic movement, a heat sensitive medium in said hollow member, a warm portion and a cool portion associated with said hollow member and in spaced relation with respect to each other, said heat sensitive medium being adapted to volatilize when in proximity to said warm portion and to flow toward said cool portion and to condense when in proximity to said cool portion, said heat sensitive medium being one of low boiling point and adapted to boil at ordinary room temperature when condensation occurs at said cool portion, said cool portion being adapted to be cooled, and maintained cooled during operation of the device, to a temperature sufficiently below the temperature of said warm portion to cause at least a partial condensation of said heat sensitive medium therein, the weight of the condensed heat sensitive medium in proximity to the cool portion causing movement of the operating member in one direction, said condensed heat sensitive medium flowing from said cool portion to said warm portion and causing movement of said operating member in the opposite direction, said operated member being physically associated with a portion of said operating member, said condensed heat sensitive medium in proximity to said warm portion then being revolatilized, such cycle of vaporization and condensation of said medium and movement thereof in said hollow member being continued over long periods of time.

2. A toy, amusement device or the like, comprising an operated member, said member representing an object adapted to convey intelligence to the observer, an operating member adapted to create power and cooperatively associated with said operating member, said operating member comprising an air-exhausted hollow member, a support associated with said hollow member with respect to which said hollow member has cyclic movement, a heat sensitive medium in said hollow member, a warm portion and a cool portion associated with said hollow member and in spaced relation with respect to each other, a cooling medium associated with said cool portion, adapted to maintain said cool portion cooled during operation of the device, said heat sensitive medium being adapted to volatilize when in proximity to said warm portion and to flow toward said cool portion and to condense when in proximity to said cool portion, the weight of the condensed heat sensitive medium in proximity to the cool portion causing movement of the operating member in one direction, said condensed heat sensitive medium flowing from said cool portion to said warm portion and causing movement of said operating member in the opposite direction, said operated member being physically associated with a portion of said operating member, said condensed heat sensitive medium in proximity to said warm portion being revolatilized, such cycle of vaporization and condensation of said medium and movement thereof in said hollow member being continuously repeated over long periods of time.

3. An amusement device or the like, comprising a representation of an object adapted to move in a predetermined manner and conveying intelligence to the observer, a source of power physically associated with said representation for causing movement of the representation, said source of power comprising an elongated vacuum member, a mounting upon which said member is movably carried, said member having a cool and a warm portion, a heat sensitive medium sealed in said elongated member and adapted to move therein by alternative vaporization and condensation thereof at the warm and cool portions, respectively, said heat sensitive medium being one of low boiling point and adapted to boil at ordinary room temperature when condensation occurs at said cool portion, said cool portion being adapted to be cooled, and maintained cooled during operation of the device, to a temperature sufficiently below the temperature of said warm portion to cause at least a partial condensation of said heat sensitive medium therein, said member when the medium is at the cool portion being slightly higher at said last-mentioned portion than the warm portion, said condensed medium flowing down the inclined member from the cool portion toward the warm portion and by reason of the weight thereof depressing the warm portion, said medium vaporizing at the warm portion and flowing to said cool portion and condensing in proximity thereto and by reason of the weight thereof depressing the cool portion, and said cycle of operation being continued over long periods of time.

4. A device comprising an object adapted to be animated and an actuator therefor, said actuator having an elongated hollow member, the interior of said member being air-exhausted, said member being mounted upon a knife edge support for free movement thereof, said member having a cool end and a warm end, the cool end being larger than the cross-sectional area of the said member, a reservoir containing a cooling medium, said reservoir being associated with said cool end and being adapted to supply the cooling medium to said enlargement of the cool end over long periods of time, a heat sensitive medium in said elongated member and free to flow therein, said heat sensitive medium vaporizing at the warm end and flowing toward the cool end at which it is condensed and by reason of the weight thereof depressing the cool end, said condensed medium flowing from the cool end to the warm end and when in proximity to the warm end depressing the same, said actuator being carried by said amusement device, whereby said object is caused to partake of the movement of the elongated member.

5. A self-contained power unit comprising an air-evacuated hollow member, a support upon which said member is mounted for free movement, said member having a plurality of warm portions and a cool portion between said warm portions, a medium in said member adapted to flow therein from said warm portions to said cool portion, said medium comprising a liquid having a low boiling point, the liquid of said medium vaporizing or volatilizing alternately at said warm portions and thereby moving to said cool portion and condensing at said cool portion, the weight of said medium overbalancing said member on said support, said cycle continuing over long periods of time.

6. An advertising device comprising the representation of an animate figure, a portion of the representation being adapted to move and attract the attention of the observer, an actuator for said portion, said actuator comprising a self-contained power unit having physical connection with said portion, said power unit comprising an air-evacuated hollow member, a support upon which said member is mounted for free movement, said member having a warm portion and a cool portion in spaced relation on opposite sides of said support, a medium in said hollow member adapted to flow alternately to and from the warm and cool portions and across said support, said medium by reason of the weight thereof overbalancing that portion of the hollow member at which it happens to be at a given time and thereby causing movement of said hollow member, said medium comprising a liquid having a low boiling point, the liquid of said medium when said medium is at the warm portion volatilizing or vaporizing at ordinary room temperature and forcing said medium toward or to the cool portion and causing movement of the said member, said cool portion being adapted to be cooled during operation of the device, said medium reversing its direction of flow from the cool portion toward the warm portion and again causing movement of said member, said cycle of operation being continued over long periods of time, and said portion, by reason of its physical connection with said actuator, partaking of the movement thereof.

7. An amusement device comprising a hollow member formed to provide a volatilizing portion, a condensing portion and a tube constituting a fluid passage connecting said portions, said member being substantially exhausted of air, sealed, and provided with a liquid therein adapted to volatilize at ordinary room temperature when sealed in said member, means for mounting said member for cyclic movement on an axis located between the ends of said tube; said member being balanced to have normal repose in a position wherein the end of said tube communicating with said volatilizing portion is below, and the end of said tube communicating with said condensing portion is above, the horizontal plane passing through said axis; said condensing portion being adapted to have associated therewith means active to cool the same to a temperature below the prevailing room temperature and to cause condensation of vapor and a corresponding reduction of vapor pressure in said condensing portion; said member being of such construction that liquid therein will undergo volatilization in said volatilizing portion and liquid will be displaced by vapor pressure existing in said volatilizing portion when the vapor pressure in said condensing portion is reduced by condensation therein, and said displaced liquid will be moved in said tube toward and into said condensing portion and to a location on the opposite side of said axis in quantity sufficient to cause said member to become unbalanced and to move by gravity on said axis to a new position; said member being so mounted that, throughout its entire movement, it will occupy only positions in which said tube remains inclined downwardly toward said volatilizing portion, and that in said new position of said member said displaced liquid will be so disposed therein as to permit the vapor in said volatilizing portion to pass into said condensing portion and the pressures in said portions to become substantially equalized, the displaced liquid to be returned by gravity to said volatilizing portion, and said member to be restored to its position of normal repose; said device being adapted to repeat the above-described activity so long as the condensation of vapor in said condensing portion is continued; said member having associated therewith material of such character as to enable said device to convey intelligence to an observer.

8. An amusement device comprising a hollow member formed to provide a volatilizing portion, a condensing portion and a tube constituting a fluid passage connecting said portions, said member being substantially exhausted of air, sealed, and provided with a liquid therein adapted to volatilize at ordinary room temperature when sealed in said member, means for mounting said member for cyclic movement on an axis located between the ends of said tube; said member being balanced to have normal repose in a position wherein the end of said tube communicating with said volatilizing portion is below, and the end of said tube communicating with said condensing portion is above, the horizontal plane passing through said axis; said condensing portion being adapted to have associated therewith means active to cool the same to a temperature below the prevailing room temperature and to cause condensation of vapor and a corresponding reduction of vapor pressure in said condensing portion; said member being of such construction that liquid therein will undergo volatilization in said volatilizing portion and be displaced by vapor pressure existing in said volatilizing portion when the vapor pressure in said condensing portion is reduced by condensation therein, and said displaced liquid will be moved in said tube toward and into said condensing portion and to a location on the opposite side of said axis in quantity sufficient to cause said member to become unbalanced and to move by gravity on said axis to a new position; said member being so mounted that, throughout its entire movement, it will occupy only positions in which said tube remains inclined downwardly toward said volatilizing portion, and that in said new position of said member said displaced liquid will be so disposed therein as to permit the vapor in said volatilizing portion to pass into said condensing portion and the pressures in said portion to become substantially equalized, the displaced liquid to be returned by gravity to said volatilizing portion, and said member to be restored to its position of normal repose; said device being adapted to repeat the above-described activity so long as the condensation of vapor in said condensing portion is continued; said member having associated therewith material giving to said device the appearance of a drinking bird, the head of which constitutes said condensing portion.

CHARLES HAROLD.

REFERENCES CITED

The following references are of record in the file of this patent:

UNITED STATES PATENTS

| Number | Name | Date |
|---|---|---|
| 48,620 | Edson | July 4, 1865 |
| 242,454 | Iske | June 7, 1881 |
| 243,909 | Iske | July 5, 1881 |
| 253,867 | Iske | Feb. 21, 1882 |
| 253,868 | Iske | Feb. 21, 1882 |
| 256,482 | Iske | Apr. 18, 1882 |
| 250,821 | Iske | Dec. 13, 1881 |
| 271,639 | Iske | Feb. 6, 1883 |
| 381,441 | Thomson | Apr. 17, 1888 |
| 381,442 | Thomson | Apr. 17, 1888 |
| 386,557 | Roberts | July 24, 1888 |
| 415,747 | Thomson | Nov. 26, 1889 |
| 389,515 | Iske | Sept. 11, 1888 |
| 423,965 | Thomson | Mar. 25, 1890 |
| 607,748 | Hunt | July 19, 1898 |
| 673,022 | Iske | Apr. 30, 1901 |
| 755,048 | Russell | Mar. 22, 1904 |
| 795,761 | Fulton | July 25, 1905 |
| 956,296 | Cramer | Apr. 26, 1910 |
| 1,002,768 | Shuman | Sept. 5, 1911 |
| 1,115,524 | Fiorio | Nov. 3, 1914 |
| 1,343,577 | Okey | June 15, 1920 |
| 1,885,479 | Reuter | Nov. 1, 1932 |
| 1,952,733 | Smith | Mar. 27, 1934 |
| 2,171,246 | Schweiger | Aug. 29, 1939 |

FOREIGN PATENTS

| Number | Country | Date |
|---|---|---|
| 230,617 | England | Mar. 19, 1925 |

OTHER REFERENCES

Elementary Treatise on Physics, by Ganot, tenth edition, 1881, William Wood and Co., at 27 Great Jones Street, New York, pages 306 and 336.

Knight's American Mechanical Dictionary, 1882, Houghton, Mifflin and Co., Boston, vol. 2, page 1825, Fig. 4024.

Certificate of Correction

Reissue No. 22,900. July 15, 1947.

CHARLES HAROLD

It is hereby certified that error appears in the printed specification of the above numbered patent requiring correction as follows: Column 9, line 53, after "cooled" insert the words *and maintained cooled*; and that the said Letters Patent should be read with this correction therein that the same may conform to the record of the case in the Patent Office.

Signed and sealed this 7th day of October, A. D. 1947.

[SEAL]

THOMAS F. MURPHY,
*Assistant Commissioner of Patents.*